(12) United States Patent
Mori et al.

(10) Patent No.: US 7,924,377 B2
(45) Date of Patent: Apr. 12, 2011

(54) TRANSFLECTIVE LIQUID CRYSTAL DISPLAY APPARATUS

(75) Inventors: Kenichi Mori, Kanagawa (JP); Michiaki Sakamoto, Kanagawa (JP); Daisuke Inoue, Kanagawa (JP); Kenichirou Naka, Kanagawa (JP); Hiroshi Nagai, Kanagawa (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

(21) Appl. No.: 12/693,133

(22) Filed: Jan. 25, 2010

(65) Prior Publication Data

US 2010/0123863 A1    May 20, 2010

Related U.S. Application Data

(63) Continuation of application No. 11/756,513, filed on May 31, 2007, now Pat. No. 7,679,700.

(30) Foreign Application Priority Data

Jun. 2, 2006    (JP) .................................. 2006-155449

(51) Int. Cl.
*G02F 1/1335* (2006.01)

(52) U.S. Cl. ....................................................... 349/114

(58) Field of Classification Search .................... None
See application file for complete search history.

(56) References Cited

U.S. PATENT DOCUMENTS

| 7,255,981 B2 | 8/2007 | Otake et al. |
| 2005/0140874 A1 | 6/2005 | Lim et al. |
| 2005/0140879 A1 | 6/2005 | Nam |
| 2007/0058116 A1 | 3/2007 | Lee et al. |

FOREIGN PATENT DOCUMENTS

| CN | 1450392 A | 10/2003 |
| JP | 11-326615 A | 11/1999 |
| JP | 2003-344837 A | 12/2003 |

*Primary Examiner* — Tina M Wong
(74) *Attorney, Agent, or Firm* — Sughrue Mion, PLLC

(57) ABSTRACT

To provide a transflective liquid crystal display apparatus that employs in-plane switching mode (in-plane switching system), which exhibits a reflection property of wide view angles. Provided is a transflective liquid crystal display apparatus which comprises: a reflective area and a transmissive area; an uneven reflective plate provided in the reflective area; a flattening film laminated on the uneven reflective plate; and common electrodes and pixel electrodes arranged on the flattening film, wherein the uneven reflective plate comprises a diffusive reflecting function that is capable of diffusely reflecting light making incident at an incident angle of 30 degrees towards directions at exit angles of 0-10 degrees, and a surface of the flattening film is set to be substantially flat.

6 Claims, 10 Drawing Sheets

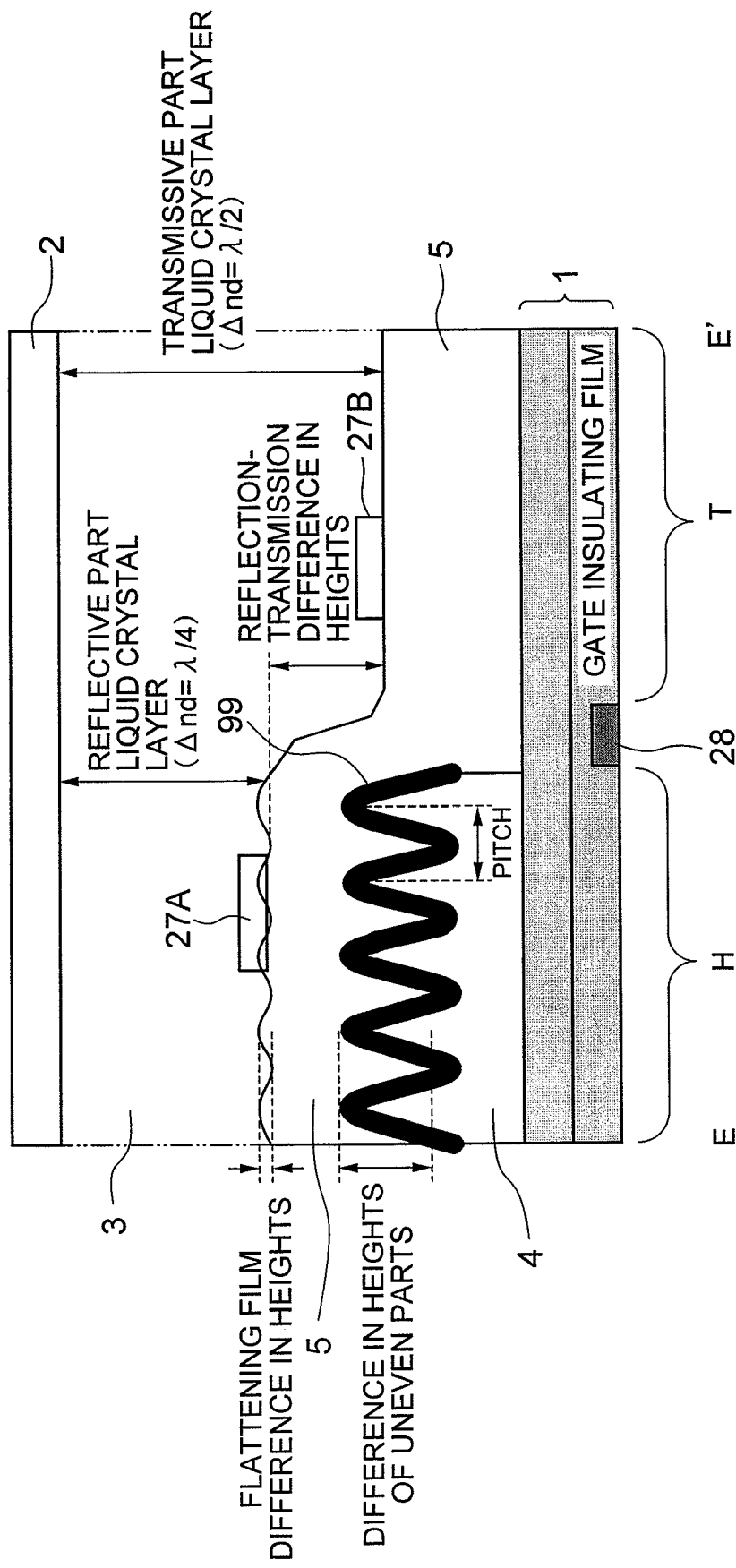

TRANSMISSIVE PART CROSS SECTION

REFLECTIVE PART CROSS SECTION

RELATION BETWEEN INCIDENT ANGLE/EXIT ANGLE AND TILT ANGLE

DEFINITION OF TILT ANGLE

GRAPH OF RELATION BETWEEN FLATTENING FILM THICKNESS AND AVERAGE TILT ANGLE OF FLATTENING FILM SURFACE

WITHOUT TRANSMISSIVE PART FLATTENING FILM

WITH TRANSMISSIVE PART FLATTENING FILM

FFS MODE

TRANSMISSIVE PART CROSS SECTION

REFLECTIVE PART CROSS SECTION

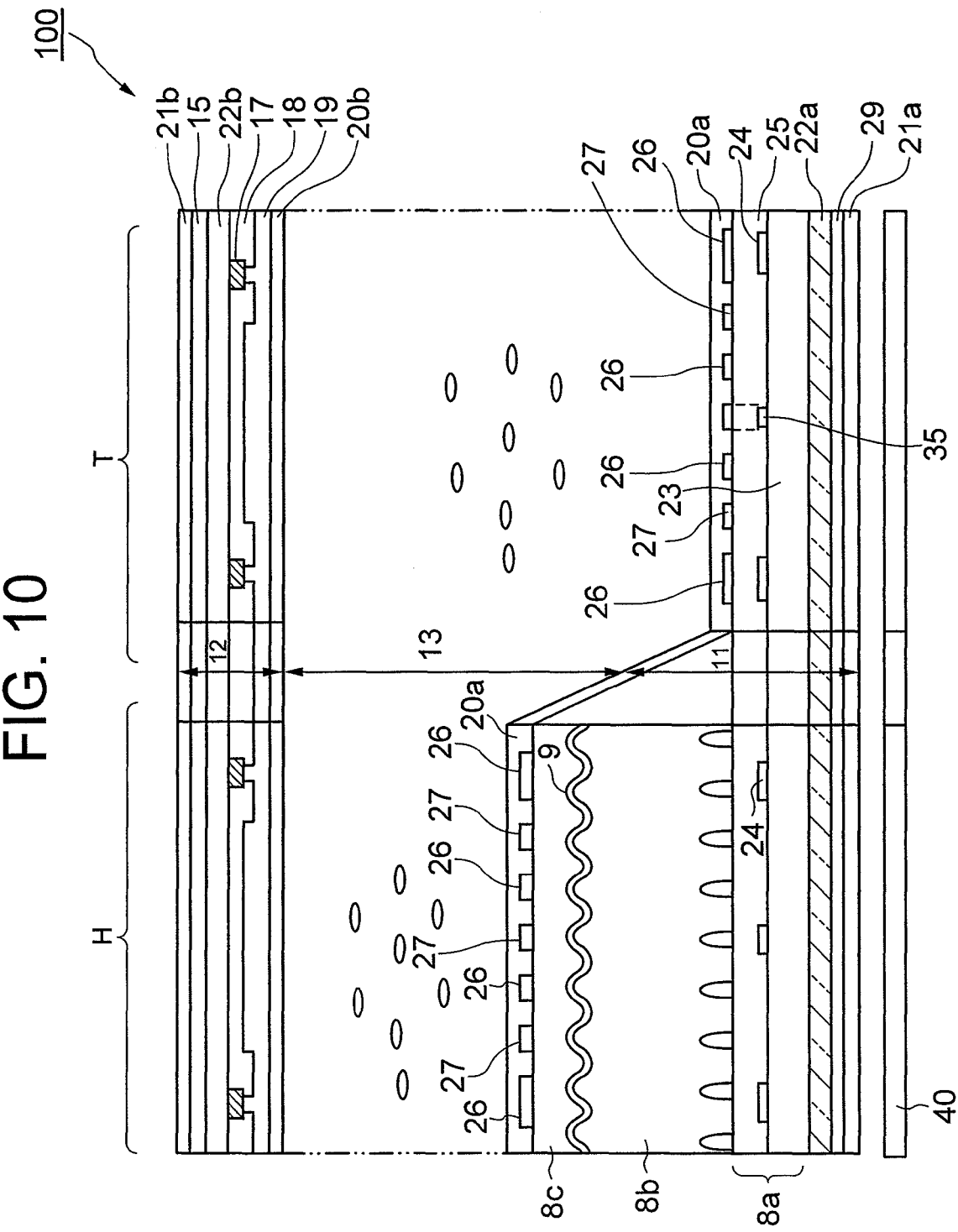

TRANSFLECTIVE LIQUID CRYSTAL DISPLAY APPARATUS

The preset application is a continuation of U.S. application Ser. No. 11/756,513 filed May 31, 2007, which claims priority to Japanese Patent Application No. 2006-155449 filed on Jun. 2, 2006. The entire disclosure of the prior applications are hereby incorporated by reference.

BACKGROUND OF THE INVENTION

1. Field of the Invention

The present invention relates to a transflective liquid crystal display apparatus and, more specifically, to a transflective liquid crystal display apparatus in which each pixel comprises a light-reflection type reflective area and a light-transmission type transmissive area.

2. Description of the Related Art

FIG. 10 illustrates a conventional case depicted in Japanese Unexamined Patent Publication 2003-344837 (Patent Literature 1). A liquid crystal display apparatus 100 shown in FIG. 10 is constituted with a lower side substrate 11, a counter side substrate 12, and a liquid crystal layer 13 held by being interposed therebetween. Further, each of the pixels constituting the display unit of the liquid crystal display apparatus 100 comprises a light-reflection type reflective area and a light-transmission type transmissive area. FIG. 10 shows a schematic sectional view of a single pixel that is disclosed in Patent Literature 1.

In FIG. 10, the counter side substrate 12 is constituted with a black matrix layer 17 formed on a transparent insulating substrate 22b as a light-shielding film, a color layer 18 that is partially overlapped with the black matrix layer 17, and a transparent overcoat layer 19 formed on the black matrix layer 17 and the color layer 18. Further, in order to prevent the liquid crystal layer 13 from being electrically influenced by the electrification from the surface of a liquid crystal display panel generated due to a contact or the like, a transparent conductive layer 15 is formed on the back face of the transparent insulating substrate 22b. The color layer 18 is formed with a resin film containing dyes or pigments of red (R), green (G), and blue (B).

Further, the lower side substrate 11 comprises: on a transparent insulating substrate 22a, a first metal layer where scanning lines (not shown) and gate electrodes (not shown) of thin film transistors used for driving are formed; a first interlayer insulating film 23 formed thereon; a second metal layer formed on the first interlayer insulating film 23, on which data lines 24, source electrodes and drain electrodes (not shown) of the thin film transistors are formed; a second interlayer insulating film 25 formed thereon; and common electrodes 26 and pixel electrodes 27 formed thereon with transparent electrodes.

The lower side substrate 11 and the counter side substrate 12 respectively comprise an alignment film 20a and an alignment film 20b on the respective opposing face sides thereof. Rubbing processing is applied thereon from the extending direction of the pixel electrode 27 and the common electrode 26 towards a prescribed direction tilted by about 10 to 30 degrees so that the liquid crystal layer 13 is aligned homogeneously. Thereafter, both substrates are laminated to face each other. This angle is called an initial alignment direction of the liquid crystal molecules.

A spacer (not shown) is provided between the lower side substrate 11 and the counter side substrate 12 for keeping the thickness of the liquid crystal layer 13. Further, a seal (not shown) is formed in the periphery of the liquid crystal layer 13 for not leaking the liquid crystal molecules to the outside.

In addition to the data lines 24 through which data signals are supplied, common electrode wirings (not shown) and the common electrodes 26 through which reference potential is supplied, and the pixel electrodes 27 that correspond to the pixels to be displayed, the lower side substrate 11 comprises scanning lines (not shown) through which scanning signals are supplied and the above-mentioned driving thin film transistors (TFTs) (not shown) which are provided on the transparent insulating substrate 22a.

A driving thin film transistor comprises a gate electrode, a drain electrode, and a source electrode, and it is provided by corresponding to each pixel in the vicinity of the intersection between the scanning line and the data line 24. The gate electrode is electrically connected to the scanning line, the drain electrode to the data line 24, and the source electrode to the pixel electrode 27.

The common electrode 26 and the pixel electrode 27 are both in a pectinate shape, and the teeth of each electrode are all extended in parallel to the data line 24. Furthermore, the teeth of the common electrode 26 and that of the pixel electrode 27 are arranged alternately with each other.

An in-plane switching system is employed for both of the above-mentioned transmissive area T and reflective area H of the liquid crystal display apparatus 100. Regarding the liquid crystal display apparatus 100, in the pixel to which the data signals (selected by the scanning signals supplied through the scanning lines, and supplied through the data lines 24) are written, parallel electric fields are generated in the above-described transparent insulating substrates 22a, 22b between the common electrodes 26 and the pixel electrodes 27. The alignment direction of the liquid crystal molecules is rotated within a plane in parallel to the transparent insulating substrates 22a, 22b in accordance with the generated electric field so as to perform a prescribed display.

A vertically long area surrounded by the above-described common electrode 26 and the pixel electrode 27 is called a column (not shown). In the above-described liquid crystal display apparatus 100, the common electrode 26 and the pixel electrode 27 are both formed with a transparent material, indium tin oxide (ITO).

Further, in the transmissive area T and the reflective area H, the common electrode 26 is formed on a layer that is closer to the liquid crystal layer than to the scanning line and the data line 24, and it is formed to have a wider width than the scanning line and the data line 24 so as to cover the scanning line and the data line 24 completely.

Furthermore, as shown in FIG. 10, in the reflective area H, a reflective plate 9 is formed on a layer that is closer to the liquid crystal layer than to the scanning line and the data line 24, and it is disposed to cover the scanning line and the data line 24 completely.

By forming the common electrode 26 and the reflective plate 9 in this manner, it is possible to shut the leaked electric field from the data line 24 and the scanning line. Thus, the effective display area that can be controlled by the electric field generated between the pixel electrode 27 and the common electrode 26 can be expanded. Therefore, the aperture ratio can be improved.

Furthermore, as can be seen from FIG. 10, the second interlayer insulating film 25 is provided between the common electrode 26 and the data line 24 in the transmissive area T.

Through setting the ratio d/$\epsilon$ of the film thickness (d) with respect to the permittivity ($\epsilon$) of the second interlayer insulating film 25 sufficiently large, the parasitic capacitance between the data line 24 and the common electrode 26 can be decreased. Further, as can be seen clearly from FIG. 10, in the reflective area H, the second interlayer insulating film 25, a second insulating film 8b, the reflective plate 9, and a third insulating film 8c are provided between the common electrode 26 and the data line 24. This provides a proper distance between the data line 24 and the common electrode 26, thereby decreasing the parasitic capacitance.

In this conventional case, the common electrode 26 and the pixel electrode 27 are both formed on the second interlayer insulating film 25 in the transmissive area T, and the common electrode 26 and the pixel electrode 27 are both formed on the third insulating film 8c in the reflective area H. Therefore, the common electrode 26 and the pixel electrode 27 can be formed by the same step and the same material, which improves the manufacture efficiency.

Further, after forming the interlayer insulating film 25, a second insulating film 8b is formed in the reflective area H. The second insulating film 8b is normally formed with a double-layer structure constituted with an uneven film and a flattening layer. However, it can also be formed with a single-layer structure by using a halftone mask.

Furthermore, the reflective plate 9 made of aluminum is formed on the second insulating film 8b whose surface is uneven. This reflective plate 9 functions to reflect the incident light diffusely. The third insulating film 8c is formed over the reflective plate 9 and the surface thereof is flattened. Further, the common electrode 26 and the pixel electrode 27 made of indium tin oxide (ITO) as in the case of the transmissive area T are formed on the third insulating film 8c, and an alignment film 20a is formed thereon to constitute the lower side substrate 11.

In the above-described conventional case shown in FIG. 10, a thin flattening film is provided on the uneven reflective plate 9 in the reflective area H, and interdigital electrodes are provided thereon. Meanwhile, the transmissive area T has a structure where the interdigital electrodes of the same layer as that of the reflective interdigital electrodes are directly formed on the second interlayer film (without providing the uneven layer and the flattening layer).

There is a difference in heights provided between the transmissive part and the reflective part (reflective part-transmissive part difference) by the difference of "uneven layer+reflective part metal+flattening layer" to provide a prescribed retardation (phase difference between two kinds of intrinsic polarization light) between the reflective part ($\Delta$nd (R)) and the transmissive part ($\Delta$nd (T)) by that difference.

The refractive index anisotropy of the liquid crystal ($\Delta$n) is about $\Delta$n=0.1. Thus, provided that $\Delta$nd (T)−$\Delta$nd(R)=($\lambda$/2)−($\lambda$/4)=137 nm, it is necessary to provide the reflective part-transmissive part difference of about 1.3 μm. In this case, about 0.1-0.3 μm is required for the film thickness of the reflective part metal (aluminum), so that the thickness of the "uneven layer+flattening layer" becomes about 1.0 μm.

Further, in the above-described conventional case, there is no restriction set in the reflection mode regarding the angle of the incident light and the angle of the exit light with respect to the liquid crystal.

The angle of the incident light and the angle of the emitted light with respect to the liquid crystal at the time of the reflection mode in the above-described conventional case will be investigated herein.

In the above-described conventional case, the in-plane switching system is employed for driving the liquid crystal. In this drive method, it is necessary to set the pretilt angle of the liquid crystal to be close to 5 degrees or less (preferably 0 degree) as much as possible.

This is because of the following reasons. That is, if the pretilt of the liquid crystal is too large, idealistic in-plane switching drive cannot be performed and there generates alignment disturbances, since the liquid crystal keeps the pretilt to be aligned in a tilted manner on the substrate surface. Therefore, contrast and the viewing angle are deteriorated, thereby deteriorating the display quality.

Now, the relation regarding the settings of the above-described tilt angle of the unevenness, the incident angle, the exit angle, and the operation of the entire apparatus will be analyzed further.

When the incident angle of the light is as shallow as 0-15 degrees and the exit angle is 0 degree, the tilt angle of the uneven reflective plate can be set as shallow, and the film thickness of the unevenness may be set as about 0.5 μm. For easing the difference in the heights of the uneven parts, it is necessary to provide a flattening film having the thickness about the same as that of the uneven film. Thus, the thickness of the flattening film also needs to be about 0.5 μm.

When the tilt angle of the uneven reflective plate is gentle as in this case, the rise and fall of the uneven parts on the surface of the flattening film under the interdigital electrodes is relatively gentle even if the uneven film or the flattening film is thin, and the pattern formation of the interdigital electrodes is relatively easy. Further, there causes no disturbance even when the liquid crystal is driven in the lateral electric field, and there is not much deterioration generated in the display quality mentioned above.

In the meantime, when the incident angle of the light is as deep as 30-15 degrees and the exit angle is 0 degree, and the tilt angle of the uneven reflective plate is deep, it is necessary to thicken the uneven film. In this case, the difference between the uneven parts on the surface of the flattening film under the interdigital electrodes becomes also significant depending on the material and the thickness of the flattening film. Therefore, the pattern formation of the interdigital electrodes becomes difficult. Further, there often causes disturbance in the liquid crystal when the liquid crystal is driven in the lateral electric field, which often results in causing deterioration of the contrast and the viewing angle. Therefore, it is necessary in such a case to form the flattening film to be thick.

As described above, when a priority is given to the flattening characteristic under the interdigital electrodes in the reflective area, the uneven film and the flattening film both become thick. Thus, in the structure of the above-described conventional case, it is difficult to set the reflective part-transmissive part difference to be about 1.0 μm, for example. Therefore, in the conventional transflective liquid crystal display apparatus of an In-plane switching mode, it is difficult to obtain the reflective characteristic of wide view angles.

SUMMARY OF THE INVENTION

The object of the present invention therefore is to improve the inconveniences of the conventional case, and to provide a transflective liquid crystal display apparatus of an in-plane switching mode (in-plane switching system), which has a reflection property of wide view angles.

In order to achieve the aforementioned object, each single pixel constituting a transflective liquid crystal display apparatus according to the present invention comprises: a reflective area and a transmissive area; an uneven reflective plate provided in the reflective area; a flattening film laminated on the uneven reflective plate; and common electrodes and pixel electrodes arranged on the flattening film, wherein, the uneven reflective plate comprises a diffusive reflecting function that is capable of diffusely reflecting light making incident at an incident angle of 30 degrees towards directions at exit angles of 0-10 degrees, and a surface of the flattening film is set to be flat or close to flat.

Therefore, the driving electrodes can be attached/formed stably on the flattening film, so that it is possible to achieve the effect of providing the reflection property of wide view angles and improving the durability of the entire apparatus.

The transflective liquid crystal display apparatus may be structured such that, as a drive system for the liquid crystal, in-plane switching (IPS) mode or field fringe switching (FFS) mode is employed for both the reflective area and the transmissive area.

Further, an average tilt angle of the above-described uneven reflective plate may be set as 3-12 degrees, and an average tilt angle of the surface of the flattening film may be set to a value not exceeding a range of 3-5 degrees. With this, a liquid crystal display apparatus which provides stable operations and comprises the reflection property of wide view angles can be obtained.

The average tilt angle of the uneven reflective plate may be set as 6-9 degrees, and the average tilt angle of the surface of the flattening film may be set to a value not exceeding a range of 3-5 degrees.

This enables the diffusive reflection to be set in a more effective state and, at the same time, the uneven part of the flattening film becomes close to flat. Therefore, the above-described electrodes can be stably attached/formed on the flattening film.

Furthermore, the uneven reflective plate may have a difference of 0.6 µm or more in heights of uneven parts, and a difference in heights on the surface of the flattening film may be 0.4 µm or less.

Moreover, $\Delta nd$ of a liquid crystal layer of the reflective area may be set as about $\lambda/4$, and $\Delta nd$ of a liquid crystal layer of the transmissive may be set as about $\lambda/2$. Also, the flattening film may be formed uniformly from the reflective area to the transmissive area continuously.

The refractive index anisotropy $\Delta n$ of the flattening film may be set as 0.001 or less.

With this, it is possible to avoid deterioration of the contrast even if a flattening film is provided in the transmissive area (transmissive part). Therefore, an excellent state can be maintained.

In the transflective liquid crystal display apparatus according to the present invention where the transmissive part (transmissive area) T and the reflective part (reflective area) H both employ the in-plane switching drive, the average tilt angle of the uneven parts of the uneven reflective plate is set at 3-12 degrees, for example, to allow dispersion of exit angles. Thus, it is possible to obtain the reflection property of wide view angles for diffusely reflecting the light form the direction at an incident angle of 30 degrees towards directions at exit angles of 0-10 degrees. Further, the flattening film is provided on the uneven reflective plate to make the top face of the layer on which the electrodes are formed to be flat or close to flat, so that the driving electrodes can be stably attached/formed. With this, it is possible to provide the transflective liquid crystal display apparatus that is capable of improving the reliability and the durability of the entire apparatus.

BRIEF DESCRIPTION OF THE DRAWINGS

FIG. 2 is a schematic sectional view of a pixel part taken along the line E-E' of FIG. 1;

FIG. 3 illustrates sectional views taken along the line F-F' and the line G-G' of FIG. 1, in which

FIG. 5 illustrates the relation regarding the tilt angle of the flattening film surface (applied over the uneven reflective plate) according to the embodiment disclosed in FIG. 1 and the electrode width provided on the flattening film surface, in which

FIG. 6 illustrates the relation between the flattening film and the base uneven film according to the embodiment disclosed in FIG. 1, in which

FIG. 9 illustrates fragmentary sectional views for showing a part of the transmissive part (transmissive area) and the reflective part (reflective area) of FIG. 8, in which FIG. 10 is a schematic fragmentary sectional view for showing the pixel part of the transflective liquid crystal display apparatus according to the conventional case.

DETAILED DESCRIPTION OF THE PREFERRED EMBODIMENTS

Figure 1:
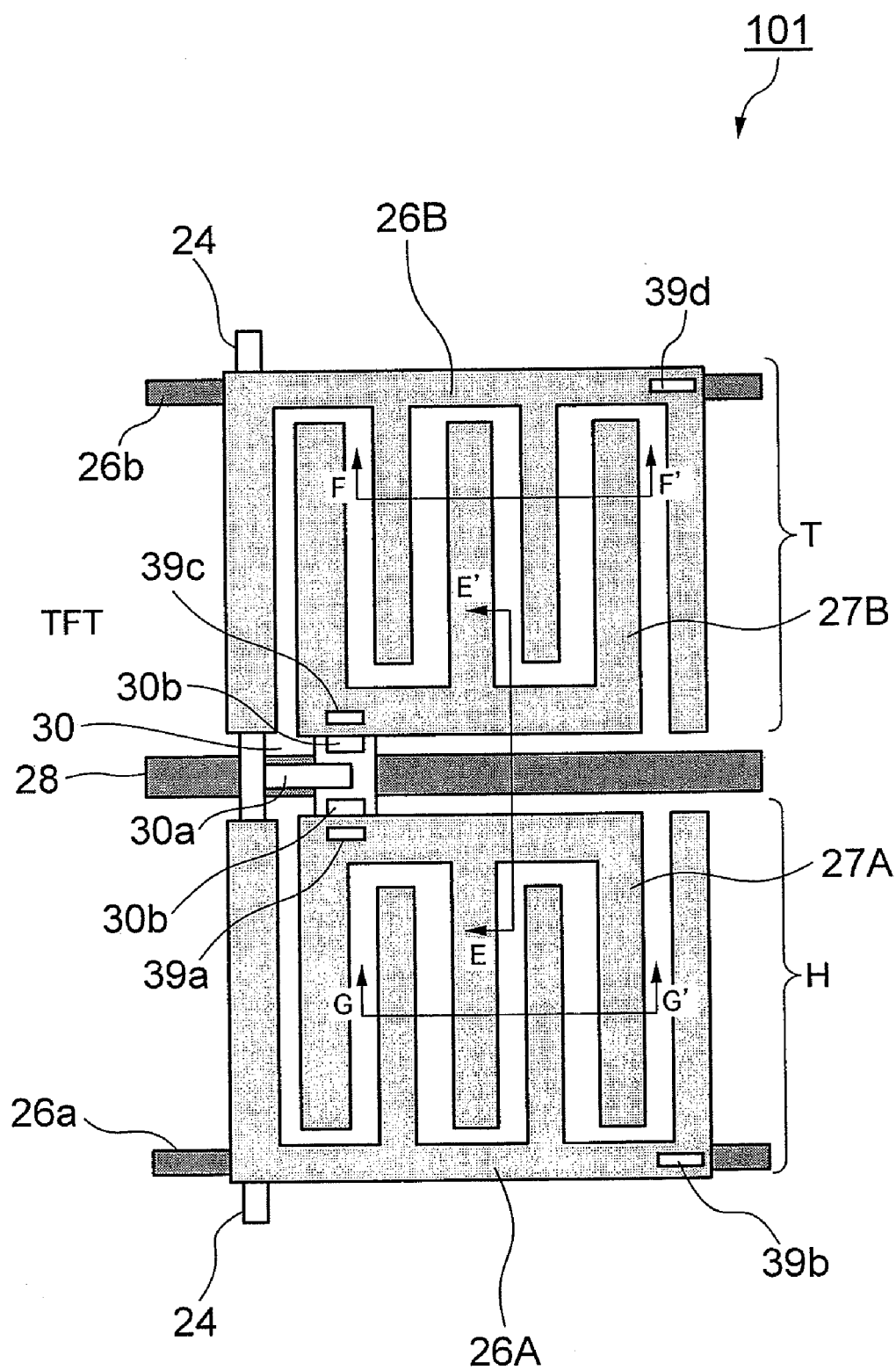
FIG. 1 is a schematic block diagram for showing a mutual relation between electrodes and the wirings thereof on the base substrate side of a transflective liquid crystal display apparatus according to an embodiment of the present invention.

An embodiment of the present invention will be described hereinafter by referring to FIG. 1-FIG. 7. The same reference numerals are applied to the structural elements that are the same as those of the conventional case described above.

FIG. 1 is a plan view for showing the positional relation between each of the electrodes that are arranged in a single pixel area of a transflective liquid crystal display apparatus (IPS mode) 101 according to the embodiment. As shown in FIG. 1, each pixel of the transflective liquid crystal display apparatus 101 is sectioned and specified into corresponding ranges by data liens 24 and scanning lines 28 provided in matrix over the entire display apparatus.

FIG. 2 shows a schematic fragmentary sectional view (sectional view taken along the line E-E' of FIG. 1) of the sectioned single pixel.

In FIG. 1, a transmissive area T is provided in the upper half part of the illustration, and a reflective area H is provided in the lower half part thereof.

In FIG. 1 and FIG. 2, the transflective liquid crystal display apparatus 101 is constituted with a lower substrate 1, a counter substrate 2, and a liquid crystal layer 3 held by being interposed therebetween.

Among those, each of the laminated part of the counter substrate 2 is mainly constituted with those having various functions for display, and it is constituted almost in the same manner as that of the conventional case (FIG. 10) described above. That is, in this counter substrate 2, a black matrix layer as a light shielding film, a color layer that is partially overlapped on the black matrix layer, a transparent overcoat layer, and an alignment film are laminated in order towards the liquid crystal side from the insulating transparent substrate. Furthermore, the counter substrate 2 comprises a conductive film made of a transparent material for eliminating the electrification that is generated due to a contact or the like, and a polarizing plate, which are laminated in order on the outer face side (opposite side of the liquid crystal) of the transparent substrate. The entire structure of the counter substrate 2 is constituted thereby. The aforementioned color layer is formed with a resin film that contains dyes or pigments of Red (R), green (G), and blue (B).

Further, each of the laminated part of the lower substrate 1 is mainly constituted with those having various functions for driving display members, and there are provided scanning lines 28 through which scanning signals are supplied and the aforementioned driving thin film transistors (TFT) 30 on the transparent insulating substrate, in addition to the data lines 24 through which data signals are supplied, common electrode wirings 26a, 26b and common electrodes 26 (26A, 26B) to which reference potential is supplied, and pixel electrodes 26A, 27B that correspond to the pixels to be displayed.

A driving thin film transistor 30 comprises a gate electrode, a drain electrode 30a, and a source electrode 30b, and it is provided by being corresponded to each pixel in the vicinity of the intersection between the scanning line 28 and the data line 24. The gate electrode of the thin film transistor 30 is electrically connected to the scanning line 28, the drain electrode 30a to the data line 24, and the source electrode 30b to the pixel electrodes 27A and 27B.

The lower substrate 1 comprises, on the above-described transparent insulating substrate, a gate metal layer where the above-described scanning lines 28, the common electrode wirings 26a, 26b and the thin film transistor 30 are formed, a first interlayer insulating film formed thereon, a second metal layer formed over the first interlayer insulating film, on which the data line 24 and the source electrode 30b and the drain electrode 30a of the thin film transistor 30 are formed, and a second interlayer insulating film formed on the second metal layer. Further, the lower substrate 1 comprises an alignment film on the liquid crystal layer side.

The common electrodes 26 (26A, 26B) and the pixel electrodes 27 (27A, 27B) are all formed in pectinate shapes as shown in FIG. 1, and each tooth in the respective electrodes is extended in parallel to the data line 24. Further, the teeth of the interdigital common electrode 26 and the pixel electrode 27 are arranged alternately.

Reference numeral 26A indicates the reflective part common electrode, and reference numeral 26B indicates the transmissive part common electrode. Further, reference numeral 27A indicates the reflective part pixel electrode, and reference numeral 27B indicates the transmissive part pixel electrode (see FIG. 1).

Each of the transmissive area T and the reflective area H described above in the liquid crystal display apparatus 101 employs the in-plane switching system. In the liquid crystal display apparatus 101, electric fields in parallel to the above-described transparent insulating substrate are generated between the common electrodes 26 (26A, 26B) and the pixel electrodes 27 (27A, 27B). The alignment direction of the liquid crystal molecules is rotated within a plane in parallel to the transparent insulating substrates 22a, 22b in accordance with the generated electric fields so as to perform a prescribed display. The common electrodes 26 (26A, 26B) and the pixel electrodes 27 (27A, 27B) are pixels to which the data signals (selected by the scanning signals supplied through the scanning lines 28, and supplied through the data lines 24) are written.

<Reflective Part (Reflection Area) H>

In the reflective area H, a base uneven film (uneven OC) 4 as a base film for forming the unevenness on the reflective plate is formed on the second interlayer insulating film (not shown) of the transparent insulating film on the lower substrate 1 side in a thickness of about 2.0 µm in average of the uneven parts, and a difference in heights of about 0.7 µm is provided to form the unevenness. On the base uneven film 4, a reflective plate (uneven reflective plate) 99 of about 0.1-0.4 µm is formed. Furthermore, a flattening film 5 is formed on the reflective plate 99 as in FIG. 2 in a thickness of about 2.0-2.5 µm using acryl or the like (see FIG. 2 and FIG. 3B).

Moreover, the reflective part pixel electrode 27A and the reflective part common electrode 26A are formed in a pectinate shape on the flattening film 5. The reflective part pixel electrode 27A is connected to the source electrode 30b of the TFT via a contact hole 39a, and the reflective part common electrode 26A is connected to the above-described common electrode wiring 26a via a contact hole 39b (see FIG. 1).

<Transmissive Part (Transmissive Area) T>

Figure 3A:
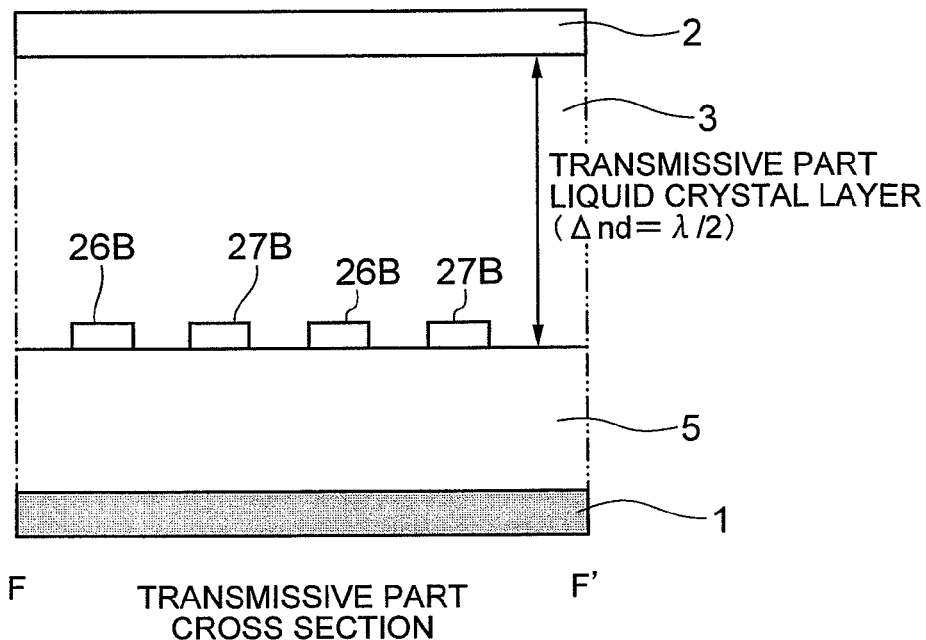
FIG. 3A is a fragmentary sectional view for showing a transmissive part (transmissive area) taken along the line F-F' of FIG. 1.
Figure 3B:
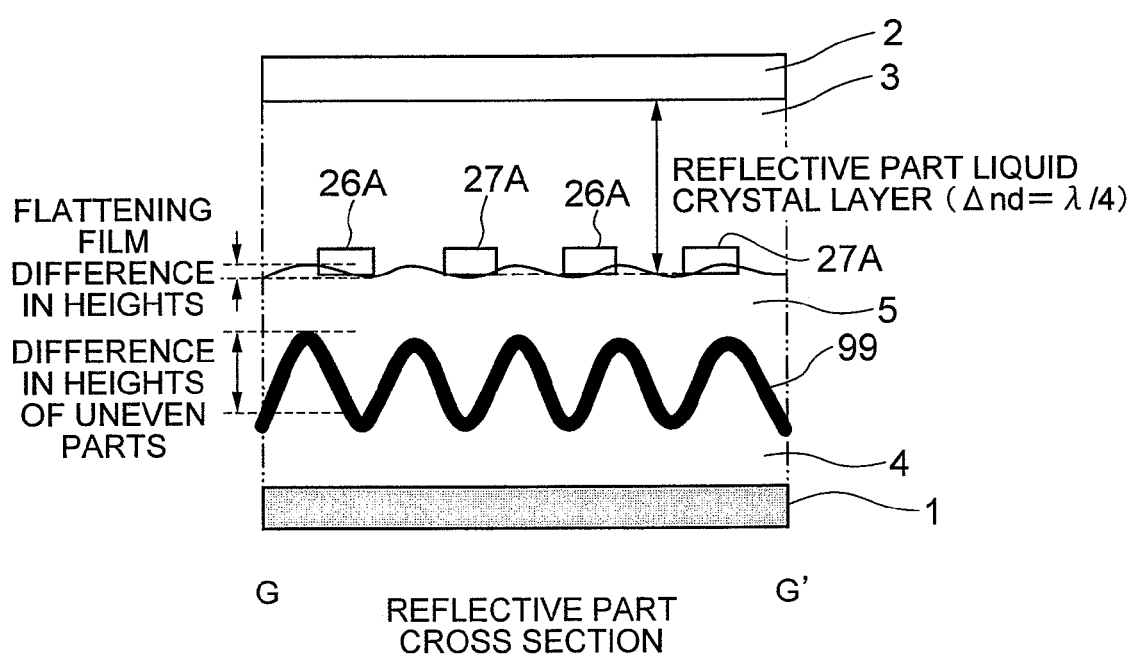
FIG. 3B is a fragmentary sectional view for showing a reflective part (reflective area) taken along the line G-G' of FIG. 1.

Meanwhile, in the transmissive area T, the flattening film 5 in common to the reflective area H is formed (see FIG. 2) on the above-described second interlayer insulating film (not shown), and the interdigital transmissive part pixel electrode 27B and transmissive part common electrode 26B are formed thereon (see FIG. 3A). The pixel electrode 27B and the common electrode 26B may be formed in common with the above-described reflective area H and extendedly provided therefrom. The pixel electrode 27B is connected individually to the source electrode 30b of the TFT via a contact hole 39c, and the transmissive part common electrode 26B is connected to the common electrode wiring 26b via a contact hole 39d (see FIG. 1).

The lower substrate 1 and the counter substrate 2 comprise an alignment film provided thereon, respectively, on the liquid crystal layer 3 side. Then, as shown in the drawing, rubbing processing is applied towards a prescribed direction tilted by about 10-30 degrees from the extending direction of the pixel electrodes 27A, 27B and the common electrodes 26A, 26B so that the liquid crystal layer is aligned homogeneously. Thereafter, both substrates are laminated to face each other. This angle is called an initial alignment direction of the liquid crystal molecules.

Further, a spacer (not shown) is provided between the lower substrate 1 and the counter substrate 2 for keeping the thickness of the liquid crystal layer 3. Further, a seal (not shown) is formed in the periphery of the liquid crystal layer 3 for not leaking the liquid crystal molecules to the outside. In the above-described liquid crystal layer 3, electric field drive (liquid crystal display) by the in-plane switching drive is executed with the electric fields applied between the interdigital common electrodes 26A, 26B and pixel electrodes 27A, 27B provided by corresponding thereto as described above.

<Relation Between Angle of Incident/Exit Light with Respect to Liquid Crystal and Tilt Angle of Uneven Reflective Plate>

Now, there will be described the relation regarding angles of the incident/exit light to/from the liquid crystal 3 side and the tile angle of the uneven reflective plate 99 according to the embodiment.

Figure 4:
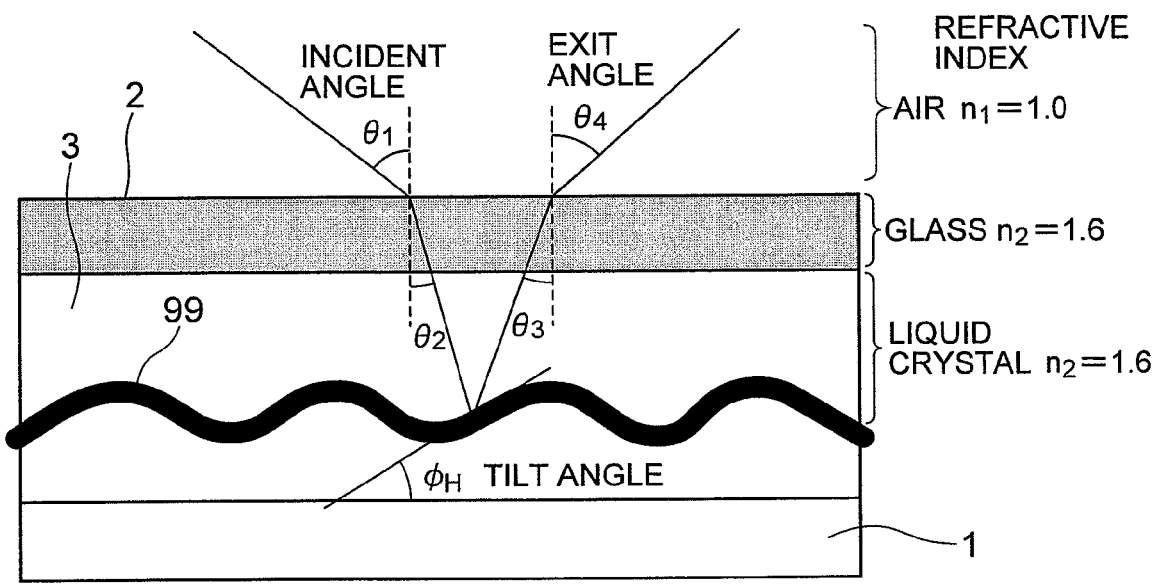
FIG. 4 is an illustration for describing the relation between the tilt angle of an uneven reflective plate of the embodiment disclosed in FIG. 1 and the incident angle/exit angle of light.

FIG. 4 shows the relative relation between the incident angle $\theta_1$/exit angle $\theta_4$ and the tilt angle $\phi_H$ of the uneven reflective plate 99.

The tilt angle $\phi_H$ of the uneven reflective plate 99 is calculated by the following expressions.

$$n_1 \sin \theta_1 = n_2 \sin \theta_2 \quad (1)$$

$$\theta_3 = \theta_2 \phi_H \quad (2)$$

$$n_1 \sin \theta_4 = n_2 \sin \theta_3 \quad (3)$$

It is noted here that $n_1=1.0$ and $n_2=1.6$. In the above-described conventional technique shown in FIG. 10, the uneven reflective plate 9 is formed such that the light making incident at an incident angle ($\theta_1$) of 15 degrees is reflected diffusely in the direction at an exit angle ($\theta_4$) of 0 degree. However, in the case where the in-plane switching drive is employed to the reflective area (uneven reflective plate 99) as described in the embodiment, there is required the uneven reflective plate 99 which has such a tilt angle $\phi_H$ that the light making incident at the incident angle ($\theta_1$) of 30 degrees is reflected diffusely in the direction at the exit angle ($\theta_4$) of 0-10 degrees, in order to achieve wide view angles in the reflection mode.

Figure 5A:
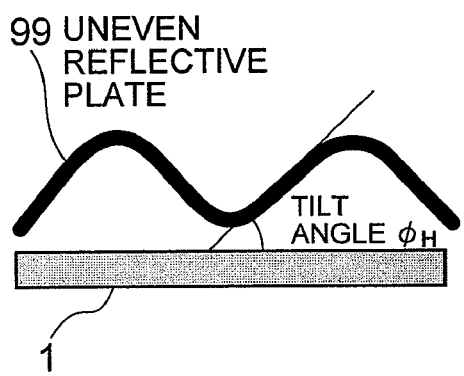
FIG. 5A is an illustration for describing the tilt angle of the uneven reflective plate.
Figure 5B:
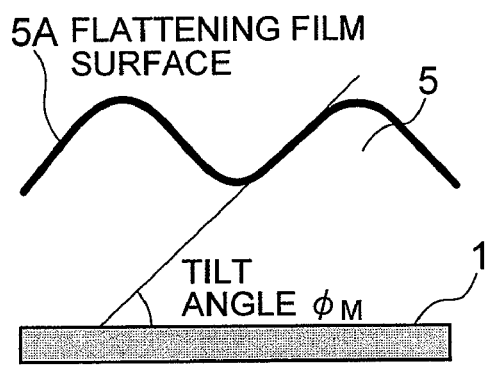
FIG. 5B is an illustration for describing the tilt angle of the flattening film surface.

As shown in FIG. 5A and FIG. 5B, the tilt angle $\phi_H$ is an angle formed between the lower substrate 1 and a tangent from an arbitrary point on the uneven reflective plate 99 or a tangent on an arbitrary point on the surface 5A of the flattening film 5.

Further, as shown in FIG. 4, the tilt angle $\phi_H$ of the uneven reflective plate 99 is about 2-5 degrees, when light makes incident from the direction at the incident angle ($\theta_1$) of 15 degrees and the reflected light is diffused in the direction of 0-10 degrees. Furthermore, the tilt angle $\phi_H$ of the uneven reflective plate 99 is about 6-9 degrees, when light makes incident from the direction at the incident angle ($\theta_1$) of 30 degrees and the reflected light is diffused in the direction of 0-10 degrees.

In this case, the tilt angle $\phi_H$ of the uneven reflective plate 99 for achieving the wide view angles may be set larger than the tilt angle of the conventional uneven reflective plate 9. With this, the uneven reflective plate 99 having a diffusive reflecting function can be set. In this case, on an experiment, it is confirmed that there is a possibility of having diffusive reflection even when the tilt angle $\phi_H$ of the uneven part of the uneven reflective plate 99 is within the range of 3-12 degrees.

It is difficult to form the uneven reflective plate 99 in such a manner that the entire tilt faces of each uneven part are constituted to have a certain tilt angle $\phi_H$. Therefore, the embodiment herein considers the tilt angle $\phi_H$ of the uneven reflective plate 99 as an average tilt angle of the entire tilt faces of each uneven part of the uneven reflective plate 99.

When executing the in-plane switching mode by the use of the in-plane switching drive, the flattening film 5 is required on the uneven reflective plate 99 in order to form the interdigital thin electrode (for example, the reflective part pixel electrode 27A) in the reflective area H. Average tilt angle $\phi_M$ of the surface of the flattening film 5 (see FIG. 5B) can be made smaller (close to flat state) than the tilt angle $\phi_H$ of the uneven reflective plate 99 by increasing the thickness of the flattening film 5.

Figure 5C:
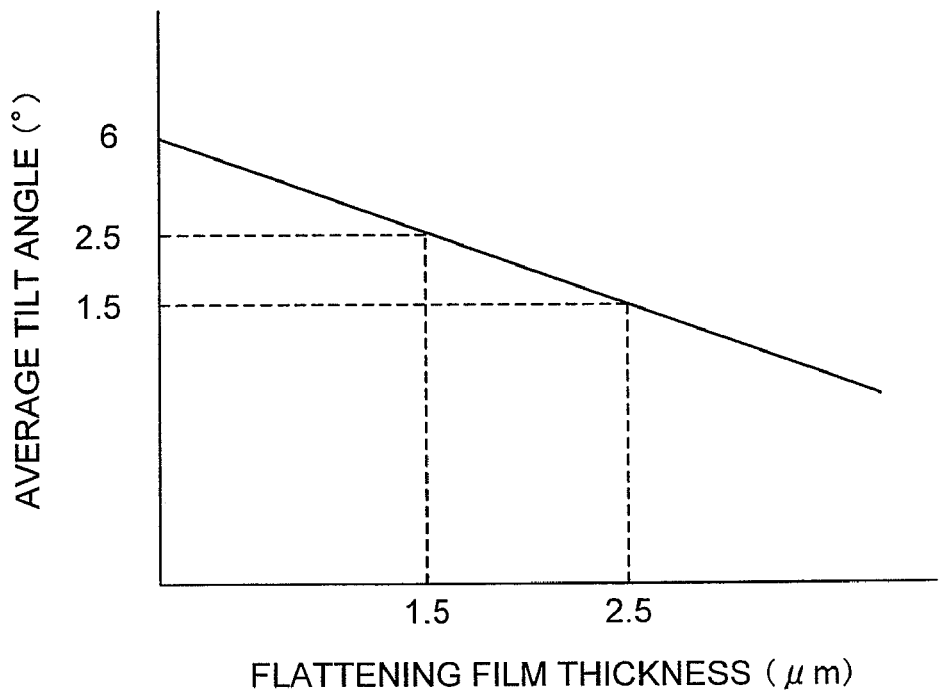
FIG. 5C is a graph for showing the relation between the flattening film thickness and the average tile angle of the flattening film surface.

The graph of FIG. 5C shows the state of changes in the thickness of the flattening film 5 and the average tile angle $\phi_M$ of the flattening film surface, when the average tilt angle $\phi_H$ of the uneven reflective plate 99 is 6 degrees.

In an experimental example where the width of the interdigital electrode was set as 3 μm, the interdigital electrode was formed when the average tilt angle ($\phi_M$) of the flattening film surface was 2.5 degrees or less, i.e. when the thickness of the flattening film 5 was 1.5 μm or more. However, when the thickness of the flattening film was smaller than 1.5 μm, exfoliation of the electrodes was observed.

Furthermore, when the width of the interdigital electrode was set as 1.5 μm for the same experiment, the interdigital electrode was formed when the average tilt angle ($\phi_M$) of the flattening film surface was 1.5 degrees or less, i.e. when the thickness of the flattening film 5 was 2.5 μm or more. However, when the thickness of the flattening film was smaller than 2.5 μm, exfoliation of the electrodes was observed. Therefore, attaching/forming the interdigital electrodes can be expected even when the average tile angle $\phi_M$ of the flattening film surface is within the range of 1.5-2.5 degrees. It is preferable, however, for the average tile angle $\phi_M$ to satisfy $\phi_M \leq 1.5$ degrees (within the confirmed range) for securely forming the electrodes.

For the above-described flattening film 5, the one with the extremely small refractive index anisotropy Δn, e.g. the one with $\Delta n \leq 0.001$, was used. For the refractive index anisotropy Δn, the smaller, the better.

By providing the flattening film 5 on the uneven reflective plate 99 in this manner, the interdigital electrode can be formed. In addition, by setting the surface that is in contact with the liquid crystal layer 3 of the reflective area H to be flat or close to flat, it becomes possible to obtain such an advantage that the rotation drive within the plane of the liquid crystal by the in-plane switching drive can be further stabilized at the same time.

Next, there will be described formation of the liquid crystal layers of the reflective part (reflective area) H and the transmissive part (transmissive area) T, in the case where the above-described uneven reflective plate 99 is applied to a transflective liquid crystal display apparatus.

When it is assumed that the average tilt angle ($\phi_H$) in the uneven part of the uneven reflective plate 99 is 6 degrees and the pitch of the uneven parts is 20 μm, the difference in heights between the uneven parts is about 1 μm. The pitch of the uneven parts is the distance between the vertex of the convex part of the uneven reflective plate 99 and the vertex of the neighboring convex part. The difference in heights between the uneven parts is the difference between the vertex of the convex part and the vertex of the neighboring concave part on each surface of the uneven reflective plate 99 or the flattening film 5 in terms of the heights (see FIG. 2).

The shape of the above-described uneven reflective plate 99 is formed in accordance with the surface shape of a base uneven film 4 (referred to as "uneven OC 4" hereinafter) as an organic film provided thereunder. When the lowest point of the uneven OC 4 surface reaches to the lower substrate 1, there is generated a flat part in the uneven reflective plate 99. Thus, the proportion of the incident light reflected regularly from the uneven reflective plate 99 becomes increased. Therefore, the reflection property is deteriorated.

Figure 6A:
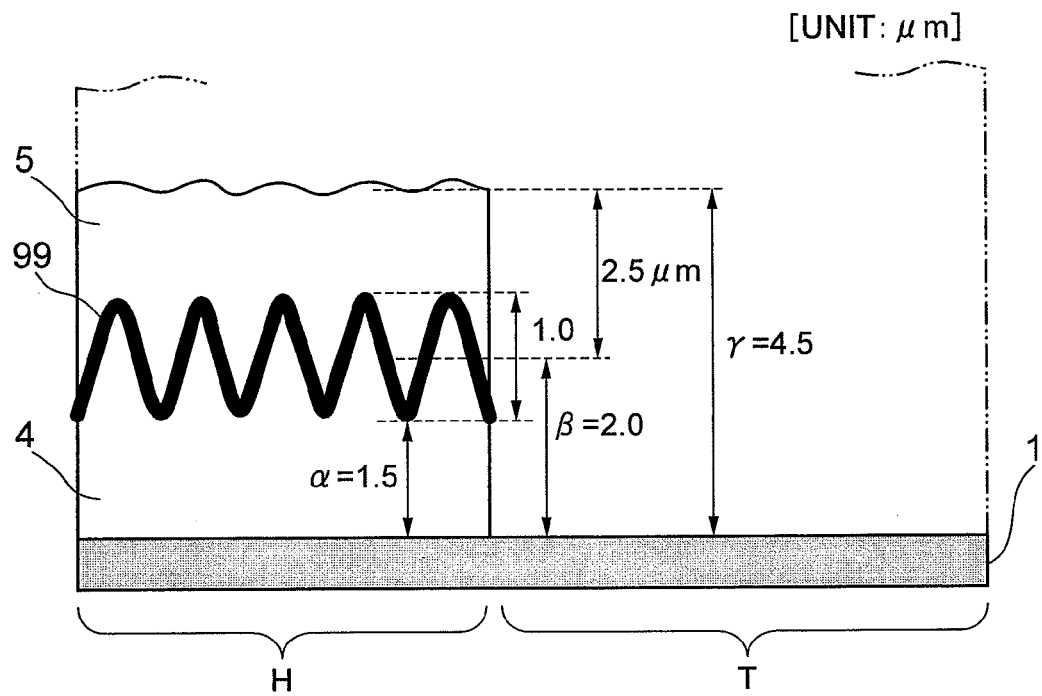
FIG. 6A shows the relation regarding the relative thicknesses of the flattening film and the base uneven film.

In order to avoid this, when the distance (α) between the lowest point of the surface of the uneven OC 4 and the lower substrate 1 is set as 1.5 μm (see FIG. 6A), for example, by considering the dispersions in providing the difference in heights, the average film thickness (β) of the base uneven film (uneven OC 4) after forming the uneven reflective plate 99 becomes about 2.0 μm as shown in FIG. 6A.

In this case, since it is necessary to form the flattening film 5 with the thickness of 2.5 μm on the uneven reflective plate 99 for forming the interdigital electrode with the width of 1.5 μm, the film thickness (γ) after forming the flattening film 5 becomes 4.5 μm. This film thickness becomes the difference in heights between the reflective part H and the transmissive part T in the pixel (see FIG. 6A).

Assuming now that a liquid crystal material with Δn=0.07 is used. Then, thickness of the liquid crystal layer 3 of the reflective part H having Δnd of 137.5 nm (λ/4) becomes about 2 μm.

When this value is employed for the thickness of the liquid crystal layer 3 of the reflective part H described above, the liquid crystal layer 3 of the transmissive part T becomes 6.5 μm, including the difference in heights between the reflective part H and the transmissive part T. Thus, the thickness of the liquid crystal layer 3 corresponds to Δnd=455 nm, which is larger than Δnd=275 of the liquid crystal layer of a λ/2 plate.

Figure 6B:
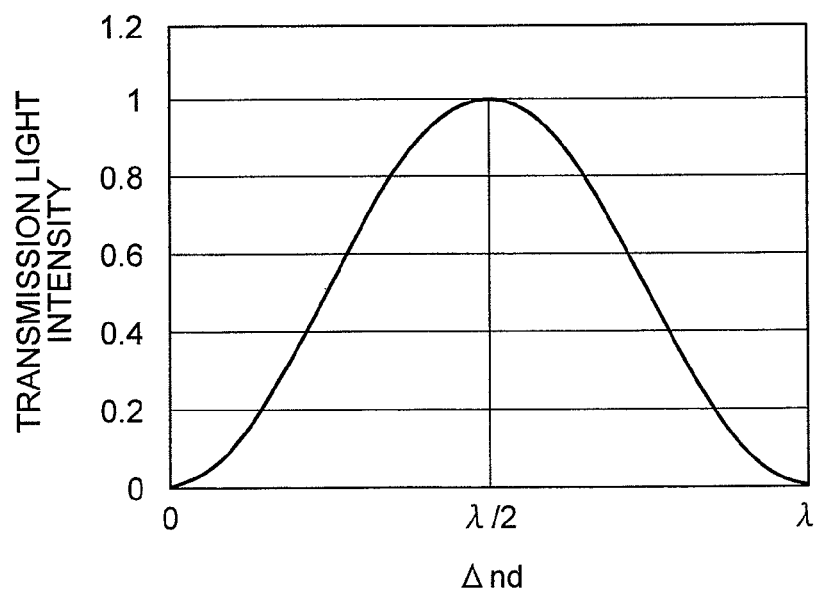
FIG. 6B shows the $\Delta nd$ dependency of the transmission light intensity.

That is, as shown in FIG. 6B, the intensity of transmission light is proportional to $\sin^2(\pi \Delta nd/\lambda)$, so that when Δnd of the liquid crystal layer 3 of the transmissive part T is shifted from a proper value, the intensity of transmission light becomes small, thereby deteriorating the contrast.

Thus, by continuously forming the flattening film 5 provided on the uneven reflective plate 99 also on the transmissive part T, the difference in heights between the reflective part H and the transmissive part T becomes 2 μm, the liquid crystal layer 3 of the transmissive part T becomes 4 μm, and Δnd becomes 280 nm. With this, the thickness of the liquid crystal layer 3 of the transmissive part T becomes almost the optimum value (see FIG. 7).

When the difference in heights on the surface of the flattening film 5 on the uneven reflective plate 99 is to be eliminated completely, the thickness of the flattening film 5 becomes extremely thicker than the average film thickness (β) of the uneven OC 4. Thus, the difference in heights between the reflective part H and the transmissive part T becomes still smaller than the proper value, by applying the flattening film 5 on the transmissive part T. Alternatively, it is possible that there is no difference in heights formed thereon.

In such a case, it is possible to obtain a proper difference in heights by eliminating the flattening film 5 of the transmissive part T by the use of half-exposure. However, it is not preferable in terms of the manufacturing efficiency, since a step therefor needs to be added.

Thus, it is not essential for the surface of the flattening film 5 to be completely flat, as long as a proper difference can be obtained between the heights of the transmissive part T and the reflective part H. For example, when the width of the interdigital electrode is 3 μm, there may be formed difference in heights of uneven parts with an average tilt angle ($\phi_M$) of 2.5 degrees on the surface. Meanwhile, when the width of the interdigital electrode is 1.5 μm, there may be formed difference in heights of uneven parts with an average tilt angle ($\phi_M$) of 1.5 degrees or less on the surface.

Figure 7:
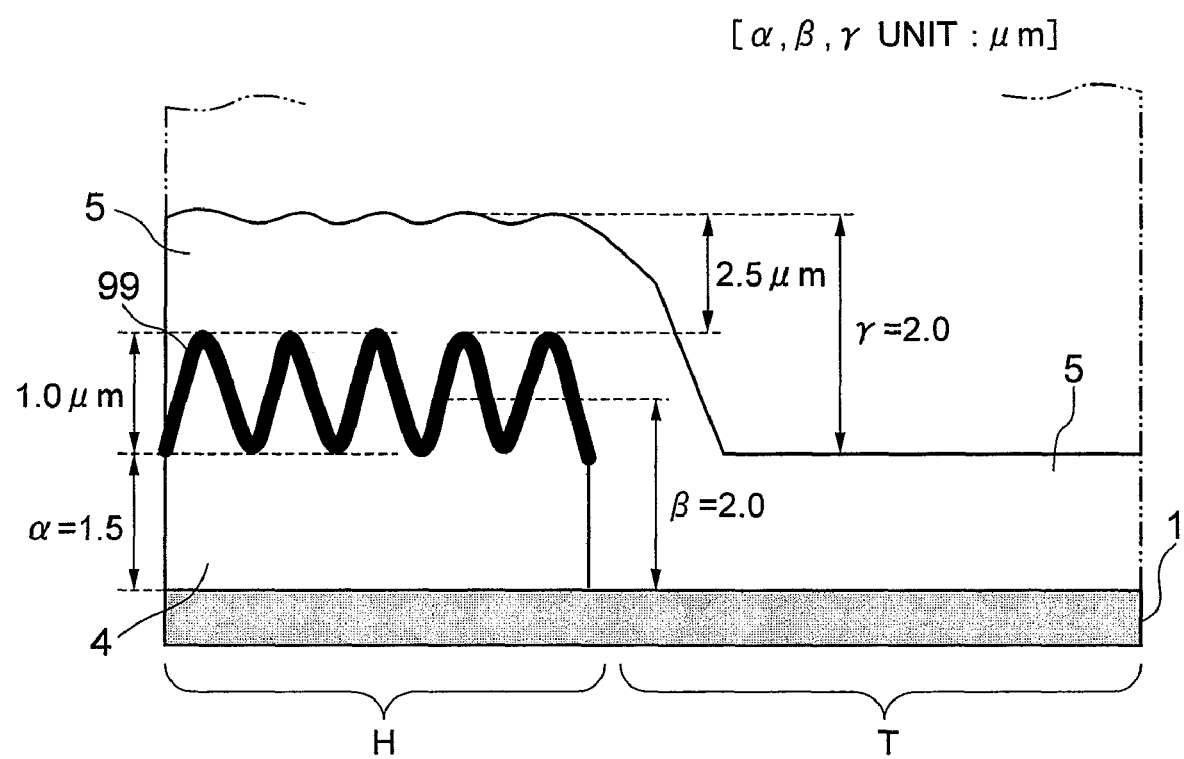
FIG. 7 is an illustration for describing the difference in heights of the transmissive part (transmissive area) and the reflective part (reflective area) of the flattening film part of the embodiment disclosed in FIG. 1.

It has already been described to form the flattening film 5 uniformly on the transmissive part T and the reflective part H so as to provide the difference in heights between the transmissive part and the reflective part H. In that case, the flattening film 5 is additionally applied to the transmissive part T, compared to the conventional case described above. In the structure of FIG. 7, when Δn of the flattening film 5 is 0.1, Δnd of the transmissive part T is changed by 250 nm because "2500×0.1=250". When this Δnd is shifted from a proper value, the intensity of the transmission light becomes weak, as shown in FIG. 6B. However, if Δn of the flattening film 5 is extremely small (for example, about 0.001), the change in Δnd can be suppressed to 2.5 nm. Thus, there is almost no change generated in the intensity of the transmission light, so that deterioration in the contrast can be avoided. Therefore, it is better for Δn of the flattening film 5 to be smaller.

Another Embodiment

Figure 8:
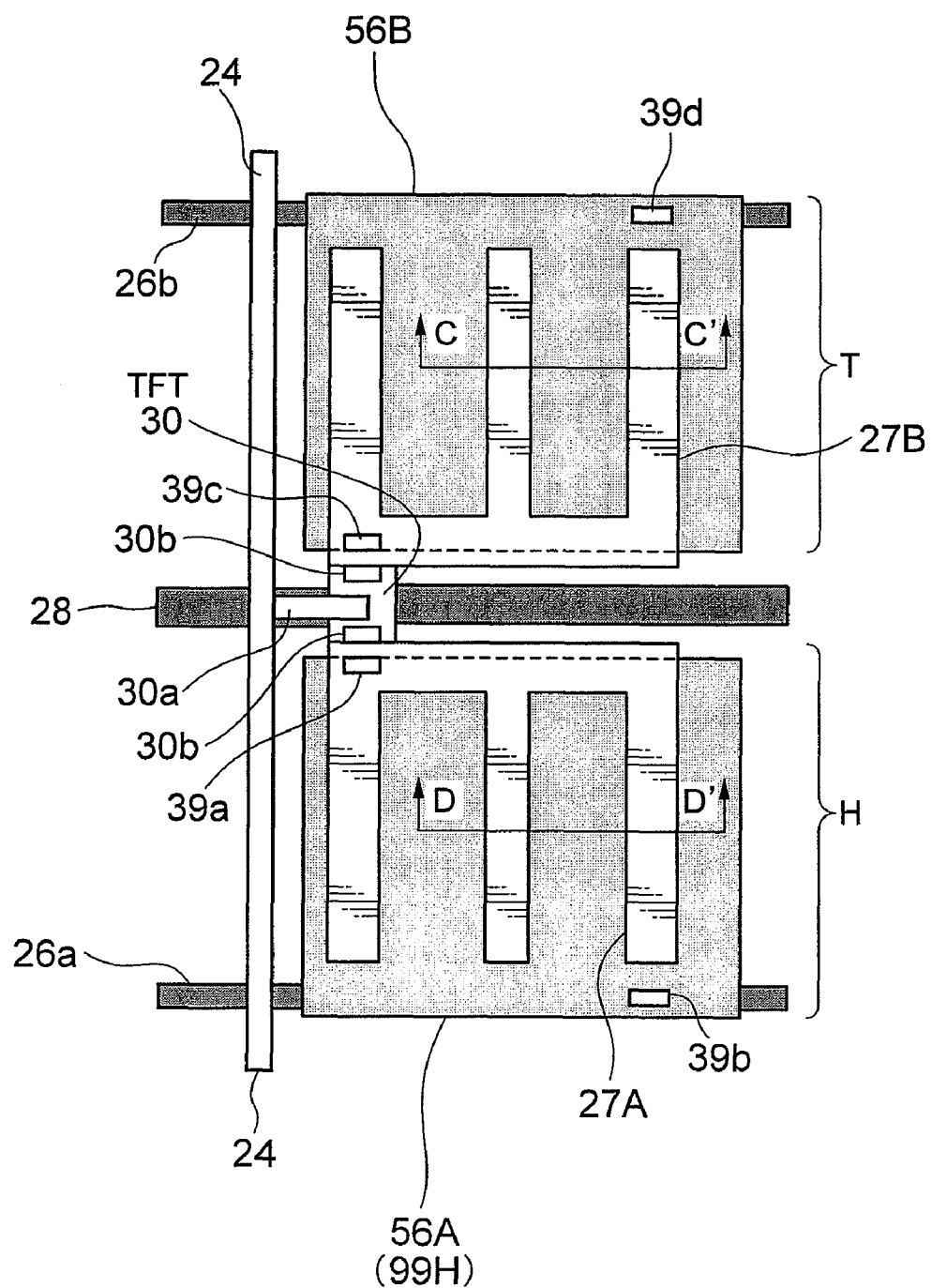
FIG. 8 is an illustration for showing the relation between the pixel electrodes and the common electrodes according to another embodiment.

FIG. 8-FIG. 9 illustrate another embodiment.

This embodiment illustrates the case where the uneven reflective plate 99 and the flattening film 5 associated therewith according to the above-described embodiment are applied to an FFS mode liquid crystal display apparatus.

As shown in FIG. 8-FIG. 9, the FFS mode liquid crystal display apparatus is peculiar in respect that an uneven reflective plate 99H formed equivalently with the above-described uneven reflective plate 99 is also used as a reflective part common electrode 56A (i.e. common electrode 56), and a transmissive part common electrode 56B is loaded closely to the base substrate 1 described above.

Figure 9A:
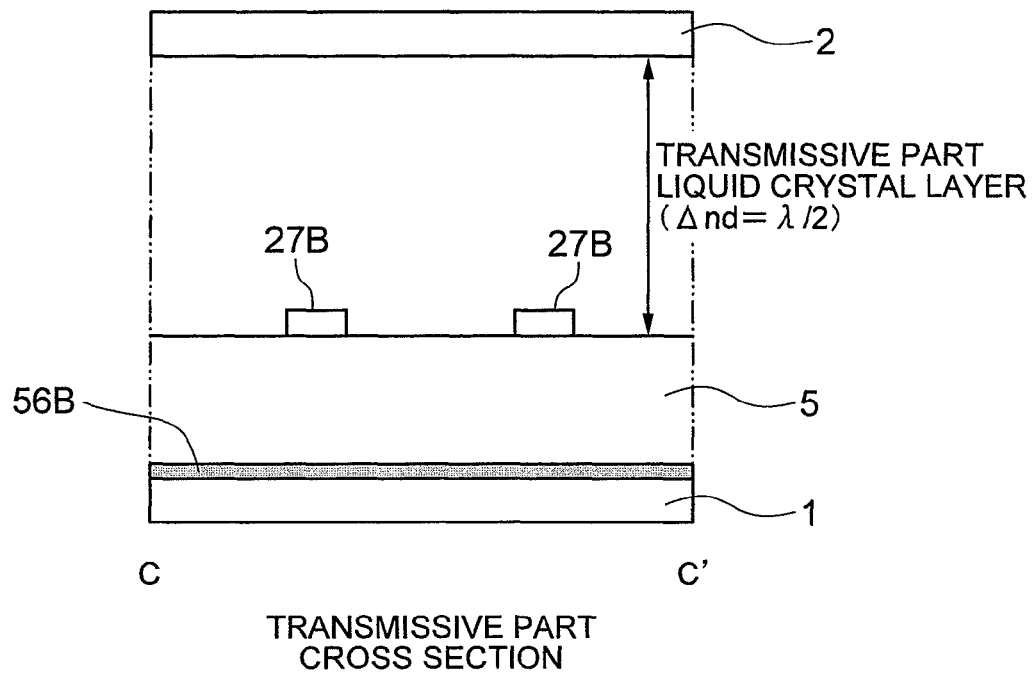
FIG. 9A is a schematic fragmentary sectional view taken along the line C-C' of FIG. 8.
Figure 9B:
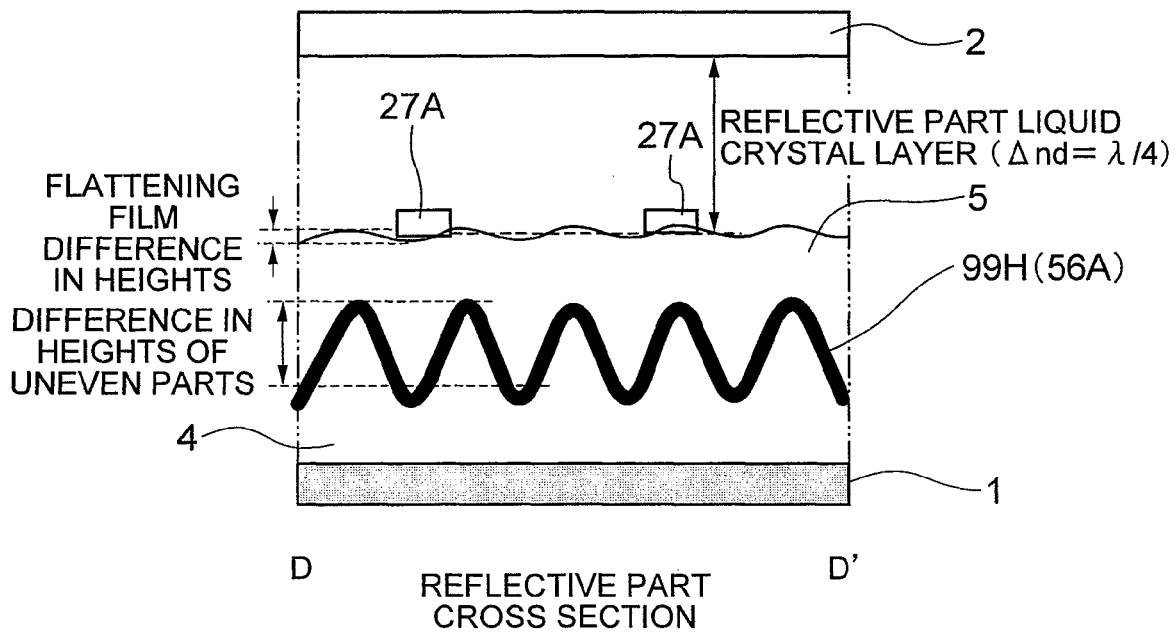
FIG. 9B is a schematic fragmentary sectional view taken along the line D-D' of FIG. 8.

That is, the common electrode and the pixel electrode are not mounted on the same layer in the FFS mode liquid crystal display apparatus. In any cases, the transmissive part common electrode 56B and the uneven reflective plate 99H that also functions as the reflective part common electrode 56A are provided, respectively, on the base substrate 1 side through the flattening film 5 as shown in FIG. 8 and FIGS. 9A, 9B. Other structures and the effects are the same as those of the above-described embodiment.

In this way, it is also possible to obtain a liquid crystal display apparatus that functions as the one obtained in the case of the embodiment described by referring to FIG. 1-FIG. 7.

With each of the embodiment as described above, the followings can be found as a result of trying out the various kinds of experiments as described above.

That is, in a transflective liquid crystal display apparatus where both the transmissive part (transmissive area) T and the reflective part (reflective area) H employ the in-plane switching drive, it becomes possible to diffusely reflect the light from the direction at the incident angle of 30 degrees in wide view angles in the directions at the exit angles of 0-10 degrees, through setting the tilt angle of the uneven reflective plate 99 or 99H at 3-12 degrees (preferably 6-9 degrees). Further, the flattening film 5 is provided on the uneven reflective plate 99 or 99H to make the top face of the layer on which the electrodes are formed to be flat or close to flat, so that the driving electrodes can be stably attached/formed. With this, the stable operation and the improved durability of the entire apparatus can be achieved.

Further, since the flattening film 5 is provided not only on the reflective part (reflective area) H but also on the transmissive part (transmissive area) T, Δnd of the liquid crystal layer 3 of the reflective part H and that of the transmissive part T can be set as λ/4 and λ/2, respectively. With this, adverse influences for the display, which are generated by the differences in the optical properties of the transmissive part T and the reflective part H, can be eliminated effectively in advance.

In short, the above-described embodiments can achieve the followings.

1) In a transflective liquid crystal display apparatus where both the transmissive part and the reflective part employ the in-plane switching drive, the average tilt angle of the uneven part of the uneven reflective plate 99, 99H is set at 6-9 degrees. Therefore, it becomes possible to diffusely reflect the light from the direction at the incident angle of 30 degrees in the direction at the exit angles of 0-10 degrees.

2) The flattening film 5 is provided on the uneven reflective plate 99, 99H to make the top face of the layer on which the electrodes are formed to be flat or close to flat. Therefore, the electrodes can be stably formed.

3) Further, since the flattening film is provided also on the transmissive part, Δnd of the liquid crystal layer of the reflective part and that of the transmissive part can be set as $\lambda/4$ and $\lambda/2$, respectively. As a result, it becomes possible to provide a transflective liquid crystal display apparatus that is highly reliable and stable in operation in this respect.

The above-described structure is not applied limitedly to the optical layout and the drive method of the above-described liquid crystal display apparatuses. It can be applied generally to the transflective liquid crystal display apparatuses that employ the in-plane switching drive.

What is claimed is:

1. A transflective liquid crystal display apparatus, comprising:
    a reflective area and a transmissive area;
    an uneven reflective plate provided in the reflective area and working as a common electrode in the reflective area;
    a flattening film laminated on the reflective plate and on common electrodes in the transmissive area; and
    pixel electrodes in the both areas arranged on the flattening film, wherein
    the uneven reflective plate comprises a diffusive reflecting function that diffusely reflects light making incident at an incident angle of 30 degrees towards directions at exit angles of 0-10 degrees, and
    a surface of the flattening film is set to be substantially flat.

2. The transflective liquid crystal display apparatus as claimed in claim 1, wherein an average tilt angle of the uneven reflective plate is set as 3-12 degrees, and an average tilt angle of the surface or the flattening film is set to a value not exceeding a range of 3-5 degrees.

3. The transflective liquid crystal display apparatus as claimed in claim 1, wherein an average tilt angle of the uneven reflective plate is set as 6-9 degrees, and an average tilt angle of the surface of the flattening film is set to a value not exceeding a range of 3-5 degrees.

4. The transflective liquid crystal display apparatus as claimed in claim 1, wherein the uneven reflective plate has a difference of 0.6 μm or more in heights of uneven parts, and a difference in heights on the surface of tile flattening film is 0.4 μm or less.

5. A transflective liquid crystal display apparatus as claimed in claim 1, wherein:
    Δnd of a liquid crystal layer of the reflective area is set as about $\lambda/4$, and Δnd of a liquid crystal layer of the transmissive area is set as about $\lambda/2$; and
    the flattening film is formed uniformly from the reflective area to the transmissive area continuously.

6. A transflective liquid crystal display apparatus as claimed in claim 1, wherein reflective index anisotropy Δn of the flattening film is set as 0.001 or less.

* * * * *